United States Patent [19]

Kaneko et al.

[11] Patent Number: 4,732,827
[45] Date of Patent: Mar. 22, 1988

[54] PROCESS FOR PRODUCING ELECTROLYTE FOR REDOX CELL

[75] Inventors: Hiroko Kaneko; Ken Nozaki; Takeo Ozawa, all of Ibaraki; Koichi Oku, Tokyo; Takashi Shimanuki, Tokyo; Yoshinori Koga, Tokyo, all of Japan

[73] Assignees: Japan Metals and Chemical Co., Ltd.; Agency of Industrial Science and Technology, both of Japan

[21] Appl. No.: 881,273

[22] Filed: Jul. 2, 1986

[30] Foreign Application Priority Data

Jul. 5, 1985 [JP] Japan .................................. 60-147684
Nov. 19, 1985 [JP] Japan .................................. 60-259591

[51] Int. Cl.⁴ .......................... H01M 4/36; C22B 34/00
[52] U.S. Cl. ..................................... 429/202; 429/109; 423/53; 423/150; 75/84; 75/108
[58] Field of Search ............... 429/188, 202, 105, 107, 429/109, 101, 17, 19; 423/53, 138, 150; 75/84, 101, 108, 121

[56] References Cited

U.S. PATENT DOCUMENTS

| | | | |
|---|---|---|---|
| 1,403,237 | 1/1922 | Eustis | 423/53 |
| 2,125,642 | 8/1938 | Meyer | 423/53 |
| 2,197,146 | 4/1940 | Erasmus et al. | 423/53 |

FOREIGN PATENT DOCUMENTS

| | | |
|---|---|---|
| 137895 | 11/1975 | Japan . |
| 37530 | 8/1982 | Japan . |
| 148068 | 8/1985 | Japan . |

Primary Examiner—Anthony Skapars
Attorney, Agent, or Firm—Parkhurst & Oliff

[57] ABSTRACT

A process for producing an anolyte and a catholyte for redox cells which comprises the steps of heating chromium ore together with carbonaceous substances to produce a pre-reduced chromium product produced a part of iron and chromium in chromium ore, dissolving the pre-reduced chromium product in hydrochloric acid and/or sulfuric acid iron and chromium. Thus, the dissolving step can be simplified, the predetermined concentration can be simply regulated.

8 Claims, 3 Drawing Figures

Concentration of $Fe^{2-}$

PROCESS FOR PRODUCING ELECTROLYTE FOR REDOX CELL

BACKGROUND OF THE INVENTION

This invention relates to a process for producing both electrolytes for a redox cell.

Since electric power can be readily converted into various types of energy to be controllable and to have no environmental pollution at consumption, the ratio of the electric energy consumption to total energy consumption is increasing in every year. The feature of supplying electric power resides in the simultaneous production and consumption. It is required for electric power industry to supply electric power of high quality at constant frequency and voltage while rapidly responding to the variation in the power consumption in the above restriction. The output power is in fact hardly varied, but a nuclear power plant and a modern coal power plant of high efficiency are operated as high as the rated maximum efficiency, and a hydraulic power plant adapted to generate in response to the variation in the power consumption is used for an increase in the large power demand during a day time.

Thus, the night excessive power by the nuclear and coal power plants of high economy is stored with pumped-hydro electric plants, but the installation conditions of the pumped hydroelectric plants gradually become severe.

From the above mentioned circumstances, various types of secondary battery have been studied as a process for storing electric power of high universal energy without environmental pollution, and the redox cell in which two kinds of redox solutions are contacted through an ion exchange membrane has been recently developed remarkably.

The principle of this redox cell will be described with reference to FIG. 1, which shows an electric power storage system using a 2-tank type redox cell system. In FIG. 1, numeral 1 designates a power plant, numeral 2 designates a substation, numeral 3 designates a load, numeral 4 designates an inverter/connector, numeral 5 designates a redox cell system, and the redox cell system 5 is composed of tanks 6, 7, a flow type electrolytic cell 8 and so on.

The electrolytic cell 8, partitioned by a ion exchange membrane, is provided therein with an anolyte chamber 10a and a catholyte chamber 10b. The chamber 10a contains an anode 11 and an anolyte such as hydrochloric acid solution including, for example, Fe ions, while the chamber 10b contains a cathode 12 and a catholyte such as hydrochloric acid including, for example, Cr ions. A pump 13a is provided between the tank 6 and the chamber 10a, an anolyte circulation passage 14 is formed between the tank 6 and the chamber 10a, a pump 13b is provided between the tank 7 and the chamber 10b, and a catholyte circulation passage 15 is formed between the tank 7 and the chamber 10b.

In the constitution thus constructed, electric power generated at the power plant 1 and transmitted to the substation 2 is transformed to a proper voltage, and supplied to the load 3.

On the other hand excessive power is produced at night, the power is converted from AC to DC by the converter 4, and electric energy is stored in the redox cell system 5. In this case, the redox cell system is charged while circulating with the pumps 13a, 13b, the anolyte and the catholyte through the chambers 10a and 10b. When the supplied power is less than the demand power, the DC power is generated while circulating the anolyte and the catholyte through the chambers 10a and 10b with the pumps 13a, 13b, and is converted from DC to AC by the inverter 4. Thus, the power is supplied through the substation 2 to the load 3. In the redox cell system Fe ions are used for the anolyte and Cr ions are used for the catholyte. The charge and discharge reactions in the cell 8 are shown as the following formulae (1) to (3):

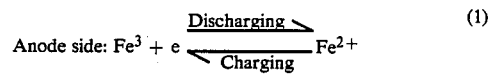   (1)

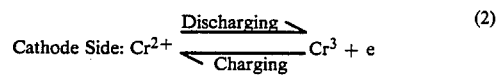   (2)

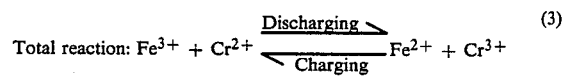   (3)

The power storage system using the redox cell is as described above. Since chromium solution used as a catholyte of the electrolyte of the redox cell has employed electrolytic chromium having 99.5% of purity, it is expensive and accordingly a large obstruction to use the redox cell in industry. Thus, a process for dissolving ferrochromium containing chromium and iron in hydrochloric acid and a process for dissolving finely pulverized ferrochromium ore in hydrochloric acid to be employed directly as the electrolytes of the redox cells have been proposed (Japanese Patent Application No. 4183/84).

Further, the process for dissolving the ferrochromium in hydrochloric acid has been also proposed to dissolve the ferrochromium, then to oxidize iron and chromium, to extract chriomic chloride ($CrCl_3$) and ferric chloride ($FeCl_3$) in solvent and to refine it (Japanese Patent Publication No. 37530/82 official gazette, Japanese Patent Laid-open No. 137895/75 official gazette).

The process disclosed in Japanese Patent Application No. 4183/84 dissolves ferrochromium and/or chromium ore in hydrochloric acid and extracts chromium-(III) and iron(II).

However, the process has such disadvantages that slightly dissolves chromium ore in the hydrochloric acid and the solubility of relatively inexpensive high carbon ferrochromium in hydrochloric acid is low so that the process must be done at high temperatures for a long period and low carbon ferrochromium is rather expensive and another disadvantage that gas bubbles are generated by the influence of silicon and carbon contained.

Moreover, since low carbon ferrochromium has high hardness and ductility, it can be hardly pulverized to fine particles. Its solubility is superior to the high carbon ferrochromium, but there also arises another disadvantage that the process for pulverizing requires a long period.

SUMMARY OF THE INVENTION

It is an object of this invention to provide a process for producing the electrolytes for redox cells. The process can improve the disadvantages of the conventional process and can simply dissolve in a predetermined concentration.

This invention provides a process for producing electrolytes for redox cells, which comprises the steps of heating chromium ore together with carbonaceous substances to produce a pre-reduced chromium product in which iron and chromium in chromium ore are partially reduced, dissolving the pre-reduced chromium product in hydrochloric acid to extract iron and chromium, and regulating in a predetermined concentration.

There is provided as another aspect a process for producing electrolytes for redox cells which comprises the steps of dissolving pre-reduced chromium product in a sulfuric acid to extract iron and chromium, further adding hydrochloric acid thereto and then regulating in a predetermined concentration.

There is provided as still another aspect a process for producing electrolytes for redox cells which comprises the steps of heating chromium ore together with carbonaceous substances to pre-reduced chromium product, dissolving the pre-reduced chromium product in sulfuric acid and hydrochloric acid to extract iron and chromium, and then mixing both solutions.

There is provided as still another aspect a process for producing electrolytes for redox cells which comprises the steps of heating chromium ore together with carbonaceous substances to pre-reduced chromium product, and dissolving the pre-reduced chromium product in mixed acid of sulfuric acid and hydrochloric acid to extract iron and chromium.

These and other objects and features will become more apparent from the following description of the preferred embodiments of the present invention when read in connection with the accompanying drawings.

DESCRIPTION OF THE PREFERRED EMBODIMENTS

Figure 1:
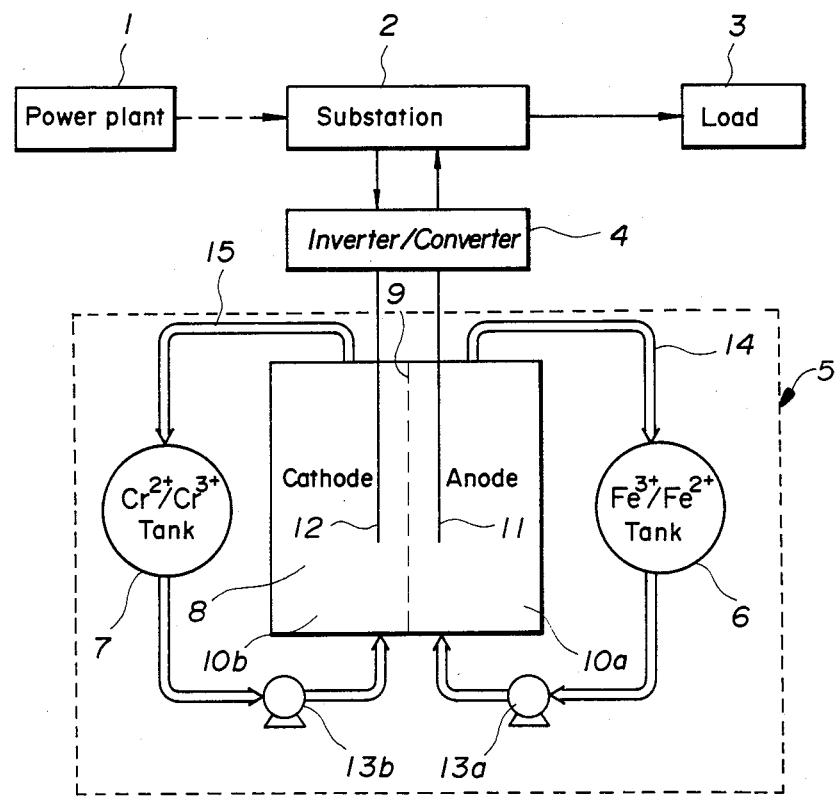
FIG. 1 is an explanatory view of a power storage system using redox cells.

The pre-reduced chromium product used in the process of this invention is, for example, a raw material for producing a ferrochromium such as powder ore indicated in Table 1 to be mixed with carbon material of 110 to 150% of the theoretical amount required for reducing iron oxide and chromium oxide in chromium ore, added with a binder, and pelletized (having 6 to 12 mm of particle size), and reduced in a rotary kiln at 1200° to 1400° C. together with carbon material of 10% or more of the theoretical reducing amount necessary. This is ordinarily called "pre-reduced chromium pellet". An example of the composition of the pre-reduced chromium pellet is illustrated in Table 2.

TABLE 1

| Production area of ore | Composition (wt %) | | | | |
|---|---|---|---|---|---|
| | $Cr_2O_3$ | FeO | $SiO_2$ | $Al_2O_3$ | MgO |
| South Africa | 45.0 | 25.0 | 2.5 | 12.0 | 10.0 |
| Madagascar | 50.5 | 17.3 | 3.2 | 14.0 | 11.0 |

TABLE 1-continued

| Production area of ore | Composition (wt %) | | | | |
|---|---|---|---|---|---|
| | $Cr_2O_3$ | FeO | $SiO_2$ | $Al_2O_3$ | MgO |
| India | 51.8 | 15.7 | 5.9 | 10.2 | 11.3 |

TABLE 2

| | | | | | | (Unit: wt %) |
|---|---|---|---|---|---|---|
| T.Cr | M.Cr | T.Fe | M.Fe | $SiO_2$ | $Al_2O_3$ | MgO |
| 30.0 | 18.0 | 15.2 | 14.4 | 10.0 | 13.2 | 13.0 |

(note): T.Cr, T.Fe are all chromium and all iron, M.Cr, M.Fe are all metallic chromium and metallic iron.

As apparent from Table 2, the iron and the chromium contained in the pre-reduced chromium pellet are mixed mainly with metallic iron and metallic chromium as well as unreduced iron oxide and chromium oxide.

When the pre-reduced chromium pellet is dissolved in hydrochloric acid, the contained metallic chromium reacts with the hydrochloric acid to be dissolved to produce chromium (III) ions.

However, when the pellet is dissolved in hydrochloric acid, all amounts of the metallic iron and metallic chromium are not dissolved but partly remain undissolved according to the dissolving conditions (concentration of hydrochloric acid, dissolving temperature and dissolving time, etc.).

As described above, the pre-reduced chromium pellet used in this invention can be dissolved in hydrochloric acid, but the extractions of the metallic iron and the metallic chromium are not complete as described above, and relatively long time is required. On the other hand, when the metallic iron and the metallic chromium in the pre-reduced chromium pellet are treated in sulfuric acid, they are almost dissolved and extracted in a short time. However, in the electrolytes for redox cells using iron ions and chromium ions, chloride must coexist in the electrolyte. Then, when dissolved in the sulfuric acid, it is necessary to add hydrochloric acid. This is because ions for the electrode reaction as the reactive substance in anolyte and catholyte of the redox cells are iron and chromium chloride complex ions.

The metallic chromium contained when the pre-reduced chromium pellet is dissolved only in sulfuric acid is reacted and dissolved in the following formula (4) to produce chromium(III)hexa aqua complex ions.

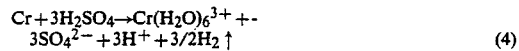

$$Cr + 3H_2SO_4 \rightarrow Cr(H_2O)_6^{3+} + 3SO_4^{2-} + 3H^+ + 3/2H_2 \uparrow \quad (4)$$

As described above, the pre-reduced chromium pellet used in this invention can be dissolved only in hydrochloric acid or only in sulfuric acid, but the produced ions are different.

When the pre-reduced chromium pellet is dissolved in hydrochloric acid, chromium(III)chloride complex ions are produced according to the following formula (5):

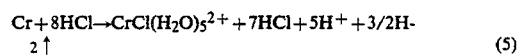

$$Cr + 8HCl \rightarrow CrCl(H_2O)_5^{2+} + 7HCl + 5H^+ + 3/2H_2 \uparrow \quad (5)$$

The redox potentials of the above two chromium complex ions are different, and the redox potentials are sequentially shifted the negative side in the order of chromium(III)chloride complex ions and chromium(III)hexa aqua complex ions.

The electrode reactivity of the chromium(III)hexa aqua complex ion is lower than that of the chromium(III)chloride complex ion. Since the redox potential of the chromium(III)hexa aqua complex ions produced by dissolving in sulfuric acid is near the hydrogen production potential, hydrogen is readily produced in the charging reaction of the cells to cause the effeciency to decrease. Therefore, it is desirable to use as reactant the chromium(III)chloride complex ions (having a fast electrode reaction rate) having small reaction resistance and being slightly separate from the hydrogen production potential.

From the abovementioned reasons, the inventors of the present invention have further studied to discover the process for producing electrolytes for the redox cells which have the steps of dissolving the pre-reduced chromium pellet in sulfuric acid and hydrochloric acid to extract iron and chromium, then mixing both solutions to contain chromium(III)chloride complex ions in the solutions to be further adapted for the electrolytes.

The mixed solution can readily convert the chromium(III)hexa aqua complex ions produced by dissolving in sulfuric acid into chromium(III)chloride complex ions in case of charging and discharging. In other words, coexistent chromium(II)complex ions perform a catalytic role to simply convert the chromium(III)hexa aqua complex ions into chromium(III)chloride complex ions. Further, it can also prevent the solubility of the iron and chromium from decreasing the solubility due to the common ion effects in case of solely using hydrochloric acid, thereby reducing the volume of the tank of the cell system.

However, most chromium(III)complex ions are slow in the ligand substituting reaction, requiring several months for the chromium(III)hexa aqua complex ions produced by dissolving in sulfuric acid to change to chloride complex ions even if adding hydrochloric acid later. Further, when dissolved only in hydrochloric acid, a large quantity of hydrochloric acid coexists, and the solubility of the iron ions and chromium ions decreases by the common ion effect of the chloride ions.

Inventors of the present inventions have further studied to result in dissolving in the mixed acid of sulfuric acid and hydrochloric acid in case of dissolving the pre-reduced chromium pellet, thereby obtaining the electrolytes further adaptive for the electrolytes in the redox cells. When the pre-reduced chromium pellet is dissolved in the mixed acid as described above, partial chromium which is hardly dissolved in hydrochloric acid can be dissolved in sulfuric acid to produce chromium(III)chloride complex ions by coexistent hydrochloric acid.

Figure 2:
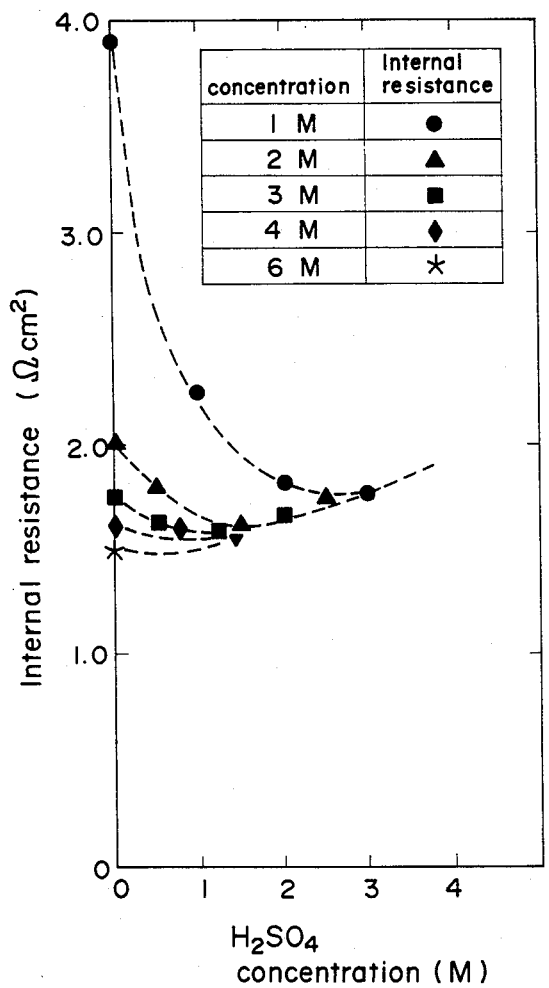
FIG. 2 is a view showing the relationship between the sulfuric acid concentration (M) and the hydrocholoric acid concentration (M) and the internal resistance of the cell.

In addition, when the pre-reduced chromium pellet is dissolved in the mixed acid of sulfuric acid and hydrochloric acid, another effect of reducing the internal resistance of the cell can be attained. In other words, the internal resistance of the redox cell is determined by the resistance of the cation membrane through which ions (hydrogen ions) are mainly passed and the electrode reaction resistance of the reactant due to the electrode reaction. Then, if the mixed acid concentration dependency of the both resistances is obtained, it can clarify the optimum mixed acid concentration for minimizing the internal resistance. The dissolving amount of the chromium is larger in the mixture acid as compared with that only in hydrochloric acid since its coexistent ion effect is smaller. When dissolved only in hydrochloric acid, if the hydrochloric acid concentration is reduced to increase the solubility, the resistance of the cation exchange membrane used as membrane of the cell increases. Then, it is necessary to increase the solubility with decreasing the chloride ion concentration, and to reduce the membrane resistance with coexisting sulfuric acid and raising the hydrogen ion concentration. From this point of view, it is effective to dissolve in mixed acid as described above. Then, the results of discussing the mixed acid range for satisfying both to reduce the internal resistance and to increase the solubility are shown in FIG. 2. It is understood from FIG. 2 that the cell resistances are almost constant in the mixed acid of 2–4M hydrochloric acid and 1–3M sulfuric acid except 1M hydrochloric acid. The 1M hydrochloric acid is less and 2M or more hydrochloric acid is necessary from the standpoint of reducing the internal resistance. The sulfuric acid is preferably 2M or more.

As evident from the above description, the hydrochloric acid in the solutions contributes to the production of chromium chloride complex ions of reactive substance, and the sulfuric acid contributes to the reduction in the membrane resistance, the improvement in the solubility of the chromium, and complete dissolving of the chromium metal in the pre-reduced chromium pellet. Then, the acids are advantageous to be used in the above concentration ranges.

The concentrations of the chromium ions and iron ions in the solutions may be regulated to become 0.5 to 2M, more preferably 1 to 2M, and the hydrochloric acid concentration is preferably 2 to 6M.

In the redox cell of chromium-iron system, iron in chromium solution of catholyte and chromium in iron solution of anolyte do not affect the influence to the cell performance.

Therefore, it is advantageous in industry to separate the mixed solutions of the iron and the chromium obtained by dissolving the pre-reduced chromium pellet, and as the process for separating both crystallization treatment utilizing the difference of solubility due to the temperature of iron chloride(II) is effective in this invention.

Figure 3:
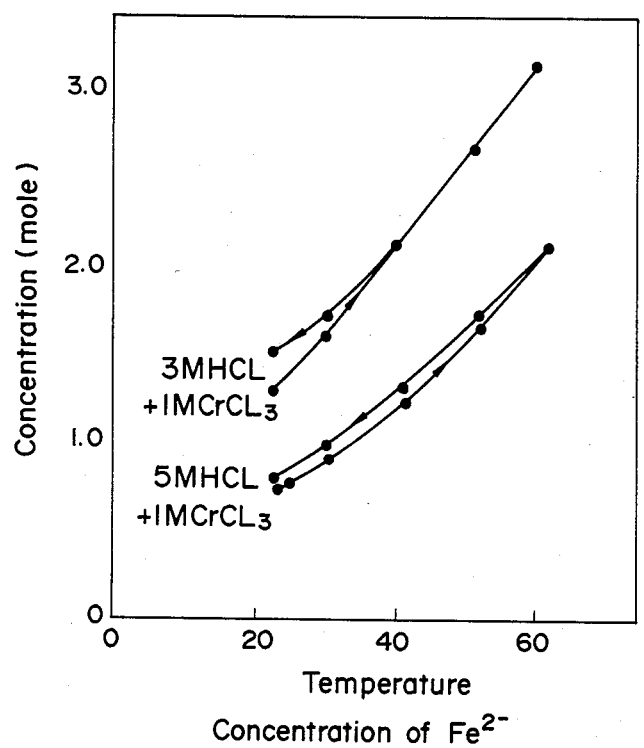
FIG. 3 is a diagram showing a solubility curve of $Fe^{2+}$ in 3M hydrochloric acid and 5M hydrochloric acid solution in 1M chromium chloride coexistence.

FIG. 3 shows the relationship between the temperature and the solubility of $Fe^{2+}$. For example, the solution which contains 5M hydrochloric acid (5M HCl) and 1M $CrCl_3$ dissolves approx. 2M of $Fe^{2+}$ at 60° C., but when this solution is cooled to 20° C., it becomes approx. 0.8M, and the remaining 1.2M is crystallized to be precipitated and separated.

Therefore, a part of iron ions in the chromium solution of catholyte can be removed simply by this process. Further, the crystallized and removed iron chloride is again dissolved in hydrochloric acid and used as anolyte.

As described above, this invention uses the pre-reduced chromium pellet of a raw material for producing a ferrochromium to produce the electrolytes for the redox cells to readily dissolve the metallic iron and the metallic chromium existing in the pre-reduced chromium pellet in the hydrochloric acid and the sulfuric acid, and readily produced $Fe^{2+}$ when the metallic iron and metallic chromium are dissolved, thereby simply obtaining $Fe^{2+}$ and $Cr^{3+}$ necessary for the electrolytes of discharging state.

Further, the undissolved residue can be reused as a raw material for producing the pre-reduced chromium pellet, and the pulverization is more simple than the ferrochromium, thereby providing good workability and accordingly improving the treating efficiency to reduce the cost.

The examples of this invention will be concretely described.

EXAMPLE 1

The composition of pre-reduced chromium pellet used in this invention and the reducing ratio of iron and chromium are listed in Table 3.

TABLE 3

| (Composition: wt %) | | | | | | | | |
|---|---|---|---|---|---|---|---|---|
| T.Cr | T.Fe | SiO$_2$ | Al$_2$O$_3$ | MgO | M.Cr | M.Fe | Cr reduction ratio (%) | Fe reduction ratio (%) |
| 31.6 | 16.3 | 5.6 | 13.5 | 12.8 | 18.7 | 15.1 | 59.2 | 92.6 |

After the pre-reduced chromium pellet was pulverized to approx. 60 mesh or smaller, 1.8 liter of 10M hydrochloric acid was added to 1 Kg of the powder, the mixture was then heated to approx. 80° C., and extracted for 12 hours.

Then, the treating solution was cooled to room temperature, and undissolved residue was filtered and separated. This residue contained ferric chloride which was automatically crystallized by cooling it. The solution composition after undissolved residue was separated is as in Table 4, and this was used directly as a catholyte.

Further, 0.8 liter of 3M hydrochloric acid was added to the undissolved residue filtered by the previous step to dissolve the ferric chloride previously crystallized, the undissolved residue was then filtered and obtained a solution shown in Table 5, and used directly as an anolyte.

TABLE 4

| Cr | | Fe | | HCl concentration |
|---|---|---|---|---|
| g/l | M | g/l | M | M |
| 67.44 | 1.30 | 37.2 | 0.67 | 3.2 |

TABLE 5

| Cr | | Fe | | HCl concentration |
|---|---|---|---|---|
| g/l | M | g/l | M | M |
| 6.25 | 0.12 | 93.75 | 1.68 | 3.0 |

The extraction ratio of Cr and Fe in the pre-reduced chromium.pellet of the raw material in the abovementioned dissolving step are 38.3 and 85.3% for T.Cr and T.Fe, and 64.7% and 92.1% for M.Cr and M.Fe in the pre-reduced chromium pellet.

EXAMPLE 2

2 liters of 9M sulfuric acid was added to 1 Kg of the same pre-reduced chromium pellet powder as in the EXAMPLE 1, heated at 80° C., and extracted for 2 hours.

After the undissolved residue was filtered and separated, 1 Kg of pre-reduced chromium pellet powder and 1.6 liter of 10M HCl were added to the solution, and again heated under the same conditions, and extracted.

The compositions of the first solution and the second solution are as in Table 6.

TABLE 6

| | Cr | | Fe | | HCl | H$_2$SO$_4$ |
|---|---|---|---|---|---|---|
| | g/l | M | g/l | M | M | M |
| First solution | 91.6 | 1.76 | 75.26 | 1.35 | 0 | 5.01 |

TABLE 6-continued

| | Cr | | Fe | | HCl | H$_2$SO$_4$ |
|---|---|---|---|---|---|---|
| | g/l | M | g/l | M | M | M |
| Second solution | 103.2 | 1.98 | 85.29 | 1.53 | 4.57 | 0.94 |

Then, the second solution was cooled to room temperature, and iron chloride crystallized together with the undissolved residue was filtered and separated. The composition of the solution as a result is as shown in Table 7, and this was used directly as a catholyte.

TABLE 7

| Cr | | Fe | | HCl | H$_2$SO$_4$ |
|---|---|---|---|---|---|
| g/l | M | g/l | M | M | M |
| 101.5 | 1.98 | 41.9 | 0.75 | 4.57 | 0.94 |

0.5 liter of 4M hydrochloric acid was added to the residue filtered in the same manner as the EXAMPLE 1, the crystallized product was dissolved, the undissolved residue was filtered and separated to obtain solution shown in Table 8 as an anolyte.

TABLE 8

| Cr | | Fe | | HCl | H$_2$SO$_4$ |
|---|---|---|---|---|---|
| g/l | M | g/l | M | M | M |
| 14.0 | 0.27 | 85.0 | 1.52 | 4.0 | 0.1 or less |

In the above dissolving steps, the extraction ratios of the metallic ion and the metallic chromium in the pre-reduced chromium pellet are approx. 100% in the first dissolving step, and in the second dissolving step, 67% of the metallic chromium and 85% of metallic iron. The pre-reduced chromium pellets after the second dissolving step retain undissolved metallic iron and metallic chromium, but they are all substantially extracted from the metallic iron and the metallic chromium in the pre-reduced chromium pellet by using the first dissolving step for producing the next electrolytes.

As a result that the solutions produced in the EXAMPLES 1 and 2 are used as the electrolytes in the redox cells, the result shown in Table 9 is obtained, and no apparent difference is obtained in the power efficiency from the case that the electrolytes obtained from the ferrochromium are used.

TABLE 9

| | (Cell performance by electrolyte obtained in this invention) | |
|---|---|---|
| Current density (mA/cm$^2$) | charging rate % | current efficiency % |
| 20 | 78.5 | 96.1 |

EXAMPLE 3

After the pre-reduced chromium pellet having the same composition as that in the EXAMPLE 1 was pulverized to approx. 60 mesh or smaller, 2.0 liters of 10M hydrochloric acid was added to 1 Kg. of the powder, heated approx. 80° C., and extracted for 12 hours.

Then, after the solution was cooled to room temperature, the undissolved residue was filtered and separated. The residue contained iron (II) chloride which is automatically crystallized by cooling. The solution composition after the undissolved residue was separated is shown in Table 10.

TABLE 10

| Cr | | Fe | | HCl |
|---|---|---|---|---|
| g/l | M | g/l | M | M |
| 63.0 | 1.21 | 35.7 | 0.64 | 4.0 |

In addition, 1.0 liter of 9M sulfuric acid was added to 0.5 Kg of the pre-reduced chromium pellet powder, heated at approx. 80° C., and extracted for 2 hours. Then, after the solution was cooled to room temperature, the undissolved residue was filtered and separated. The solution composition after separation is shown in Table 11.

TABLE 11

| Cr | | Fe | | HCl |
|---|---|---|---|---|
| g/l | M | g/l | M | M |
| 86.5 | 1.66 | 69.4 | 1.24 | 5.27 |

Then, the solution treated with hydrochloric acid, the solution treated with sulfuric acid and water were mixed at the ratio of 7:2:1 as a catholyte.

Further, that mixed solution of 0.3 liter of 10M hydrochloric acid, 0.2 liter of 9M sulfuric acid and 0.5 liter of water was added to the undissolved residue which was treated with hydrochloric acid. When the mixed solution was heated, iron(II)chloride crystallized previously was dissolved, and the undissolved residue was further filtered and separated to obtain solution used as an anolyte.

The compositions of the electrolytes thus obtained are listed in Table 12.

TABLE 12

| | Cr | | Fe | | HCl | $H_2SO_4$ |
|---|---|---|---|---|---|---|
| | g/l | M | g/l | M | M | M |
| Catholyte | 61.4 | 1.18 | 38.9 | 0.70 | 2.8 | 1.80 |
| Anolyte | 6.9 | 0.12 | 61.5 | 1.10 | 3.0 | 1.85 |

The extraction ratios of the metallic chromium and the metallic iron in the pre-reduced chromium pellet of the raw material in the abovementioned dissolving step are 67.4%, 86.0% in case of the hydrochloric acid, and 92.5%, 91.9% in case of the sulfuric acid, and the metallic chromium as a whole is 75.8% and the metallic iron is 88.8%.

Further, the cell performance of the case that the electrolytes obtained in the above treatment are used are 1.60 ohm cm$^2$ of the internal resistance being low, and 98.5% of current efficiency being preferable.

EXAMPLE 4

1 liter of mixed acid obtained by mixing 9M sulfuric acid and 10M hydrochloric acid at 1:2 was added to 0.5 Kg of the same pre-reduced chromium pellet as that in the EXAMPLE 1, heated at approx. 80° C., and extracted for 4 hours.

Then, the solution was cooled to room temperature to crystallize part of the iron(II)chloride, and filtered and separated together with undissolved residue.

Then, to regulate the acid concentration, 0.4 liter of 10M hydrochloric acid was added to the solution, screened and separated from the undissolved residue, and water was added to 1.5 liter in the entire amount as a catholyte.

Further, 0.2 liter of 10M hydrochloric acid, 0.15 liter of 9M sulfuric acid and 0.35 liter of water were added to the undissolved residue filtered by the previous treatment, heated, the iron(II)chloride crystallized previously was dissolved, and the undissolved residue was then filtered and separated to obtain solution used as an anolyte.

The compositions of the solutions are listed in Table 13.

TABLE 13

| | Cr | | Fe | | HCl | $H_2SO_4$ |
|---|---|---|---|---|---|---|
| | g/l | M | g/l | M | M | M |
| Catholyte | 52.6 | 1.01 | 20.6 | 0.37 | 2.1 | 1.90 |
| Anolyte | 5.9 | 0.11 | 60.2 | 1.08 | 2.1 | 1.95 |

The extraction ratios of the metallic chromium and the metallic iron in the pre-reduced chromium pellet of the raw material in the abovementioned dissolving step are 88.8%, 96.7%, and the cell performance of the obtained electrolytes is 1.58 ohm cm$^2$ of the internal resistance, and 99.0% of current efficiency.

What is claimed is:

1. A process for producing an anolyte and a catholyte for redox cells which comprises the steps of:
   mixing chromium ore and carbonaceous substances to form a product;
   heating the product at 1200° to 1400° C. to produce a pre-reduced chromium product in which iron and chromium in chromium ore are partially reduced;
   dissolving said pre-reduced chromium product in hydrochloric acid to extract iron and chromium.

2. A process for producing an anolyte and a catholyte for redox cells which comprises the steps of:
   mixing chromium ore and carbonaceous substances to form a product;
   heating the product at 1200° to 1400° C. to produce a pre-reduced chromium product in which iron and chromium in chromium ore are partially reduced;
   dissolving said pre-reduced chromium product in a sulfuric acid to extract iron and chromium;
   further adding hydrochloric acid thereto.

3. A process for producing an anolyte and a catholyte for redox cells which comprises the steps of
   mixing chromium ore and carbonaceous substances to form a product,
   heating the product at 1200° to 1400° C. to produce a pre-reduced chromium product in which iron and chromium in chromium ore are partially reduced;
   dissolving said pre-reduced chromium product in a sulfuric acid to extract iron and chromium;
   dissolving said pre-reduced chromium product in hydrochloric acid to extract iron and chromium; and
   then mixing both solutions.

4. A process for producing an anolyte and a catholyte for redox cells which comprises the steps of
   mixing chromium ore and carbonaceous substances to form a product;

heating the product at 1200° to 1400° C. to produce a prereduced chromium product in which iron and chromium in chromium ore are partially reduced; dissolving said pre-reduced chromium product in mixed acid of sulfuric acid and hydrochloric acid to extract iron and chromium.

5. The process according to claim 1, wherein said pre-reduced chromium product is obtained by heating to partly reduce chromium ore with carbonaceous reducing reagent in a pellet shape.

6. The process according to claim 4, wherein the concentration of the mixed acid of hydrochloric acid and sulfuric acid is in the range of 2 to 4M of hydrochloric acid and 1 to 3M of sulfuric acid.

7. The process according to claim 1, wherein the concentrations of chromium ion in the solution obtained by the dissolving step is regulated to 1 to 2M, the concentration of iron ion in the solution obtained by the dissolving step is regulated to 1 to 2M and the concentration of hydrochloric acid in the solution obtained by the dissolving step is regulated to 2 to 6M.

8. The process according to claim 1, wherein iron ions in the solution is crystallized and separated after dissolving in HCl, $H_2SO_4$ or $H_2SO_4 + HCl$.

* * * * *